US 6,636,844 B2

(12) United States Patent
Yoneyama

(10) Patent No.: US 6,636,844 B2
(45) Date of Patent: *Oct. 21, 2003

(54) METHOD AND APPARATUS FOR PRODUCING A FILE NAME IN AN IMAGE MANIPULATING SYSTEM HAVING A MEMORY DEVICE IN WHICH A FILE NAME AND A SECOND TRAIN OF CHARACTERS IS PROVIDED WHEREIN A FILE NUMBER IS AUTOMATICALLY GENERATED BY INCREMENTING A FILE NUMBER PREVIOUSLY ASSIGNED AND STORED IN MEMORY

(75) Inventor: Kaoru Yoneyama, Fussa (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,508

(22) Filed: Mar. 15, 2000

(65) Prior Publication Data

US 2002/0052988 A1 May 2, 2002

Related U.S. Application Data

(62) Division of application No. 08/241,017, filed on May 11, 1994, now Pat. No. 5,619,732.

(30) Foreign Application Priority Data

May 13, 1993 (JP) .......................................... H5-111871

(51) Int. Cl.⁷ ............................................... G06F 7/10
(52) U.S. Cl. ........................... 707/1; 707/203; 707/205; 707/511
(58) Field of Search ................................. 707/530, 1–10, 707/205–206, 511; 345/113, 340, 328, 507

(56) References Cited

U.S. PATENT DOCUMENTS

| | | | | |
|---|---|---|---|---|
| 5,261,103 A | * | 11/1993 | Takeuchi et al. ............. 717/140 |
| 5,305,450 A | * | 4/1994 | Naito et al. .................. 717/172 |
| 5,359,365 A | * | 10/1994 | Enokida ...................... 348/390 |
| 5,412,774 A | * | 5/1995 | Agrawal et al. ............. 345/340 |
| 5,448,375 A | * | 9/1995 | Cooper et al. ............... 358/403 |
| 5,473,370 A | * | 12/1995 | Moronaga et al. .......... 348/231 |
| 5,502,807 A | * | 3/1996 | Beachy ....................... 395/173 |
| 5,513,306 A | * | 4/1996 | Mills et al. .................. 707/530 |
| 5,619,732 A | * | 4/1997 | Yoneyama ................... 395/878 |
| 5,714,971 A | * | 2/1998 | Shalit et al. ................. 345/340 |
| 5,739,850 A | * | 4/1998 | Hori ........................... 348/231 |
| 5,745,902 A | * | 4/1998 | Miller et al. ................ 707/200 |
| 5,758,352 A | * | 5/1998 | Reynolds et al. ........... 707/200 |
| 5,794,226 A | * | 8/1998 | Yoneyama ....................... 707/1 |
| 5,808,628 A | * | 9/1998 | Hinson et al. .............. 345/507 |
| 5,956,084 A | * | 9/1999 | Moronaga et al. .......... 348/233 |
| 5,982,350 A | * | 11/1999 | Hekmatpour et al. ....... 345/113 |
| 5,982,364 A | * | 11/1999 | Beckwith .................... 345/328 |
| 6,055,586 A | * | 4/2000 | Yoneyama ................... 710/33 |
| 6,144,391 A | * | 11/2000 | Hinson et al. .............. 345/507 |

* cited by examiner

Primary Examiner—Christopher B. Shin
(74) Attorney, Agent, or Firm—Volpe & Koenig, P.C.

(57) ABSTRACT

An image manipulating system having a memory device in which a file name is assigned a train of characters comprised of fixed characters and a second train of characters comprised of a file number, which is generated by incrementing a file number of a name previously assigned and stored in the memory device. The first train of characters includes a file name and a system name. A third train of characters may be provided to represent a subordinate name for the file name.

12 Claims, 19 Drawing Sheets

METHOD AND APPARATUS FOR PRODUCING A FILE NAME IN AN IMAGE MANIPULATING SYSTEM HAVING A MEMORY DEVICE IN WHICH A FILE NAME AND A SECOND TRAIN OF CHARACTERS IS PROVIDED WHEREIN A FILE NUMBER IS AUTOMATICALLY GENERATED BY INCREMENTING A FILE NUMBER PREVIOUSLY ASSIGNED AND STORED IN MEMORY

This application is a Divisional Application of U.S. pat. app. Ser. No. 08/241,017 filed May 11, 1994, U.S. Pat No. 5,619,732.

BACKGROUND OF THE INVENTION

1. Field of the Invention

The present invention relates to an image manipulating system, and more particularly, to an image manipulating system having an interval recording means for repeatedly recording supplied image information at set time intervals.

2. Description of the Related Art

A conventional image recording/reproducing system, which acts as an image manipulating system using a floppy disk, a memory card, a hard disk, an optical disk, a magnetic tape, or the like as a recording medium can perform interval recording of still images once and again at set recording time intervals. The recording time interval is, independent of a recording medium employed, specified with respect to a type of recording medium whose access speed is lowest among those of applicable types of media.

Shortest times of recording time intervals that are applicable corresponding to the types of recording media for the image recording/reproducing system are 10 sec for a floppy disk and 1 sec for a memory card and hard disk in a mode of digital image data compression recording.

As mentioned above, the shortest times of recording time intervals are considerably different among the different types of recording media. Even when interval recording is desired to be performed at as short time intervals as is possible, a time interval must be restricted in the longest time period with respect to a type of recording medium whose access speed is lowest among those of applicable types of recording media. Even when a recording medium employed offers a high access speed, recording must be performed at relatively longer time intervals. This is acceptable.

SUMMARY OF THE INVENTION

An image manipulating system having a memory device and a means for assigning a file name for information to be recorded is provided so that the information can be formatted as a file and then stored in the memory device. The means for assigning the file name include means to generate a file identifier including at least two trains of characters. Onee train of characters includes fixed characters and the other train of characters includes a filed number. A value of the file number is generated by incrementing a file number of a file name previously assigned and stored in the memory device.

In another aspect, the invention provides a method for producing a file name in an image manipulating system having a memory device. The method includes, in response to a file name production request, performing the steps of: (a) creating a fixed number of character representing a file name; (b) creating a number of characters representing a file number associated with the file name created in step (a); and (c) storing the file name and file number in the memory device. Preferably, step (b) further includes creating a file number by incrementing a file number associated with a file name previously created and stored in the memory device.

Other features and advantages of the present invention will be fully apparent from the description below.

DETAILED DESCRIPTION OF THE PREFERRED-EMBODIMENT

An embodiment of the present invention will be described in conjunction with the drawings.

Figure 1:
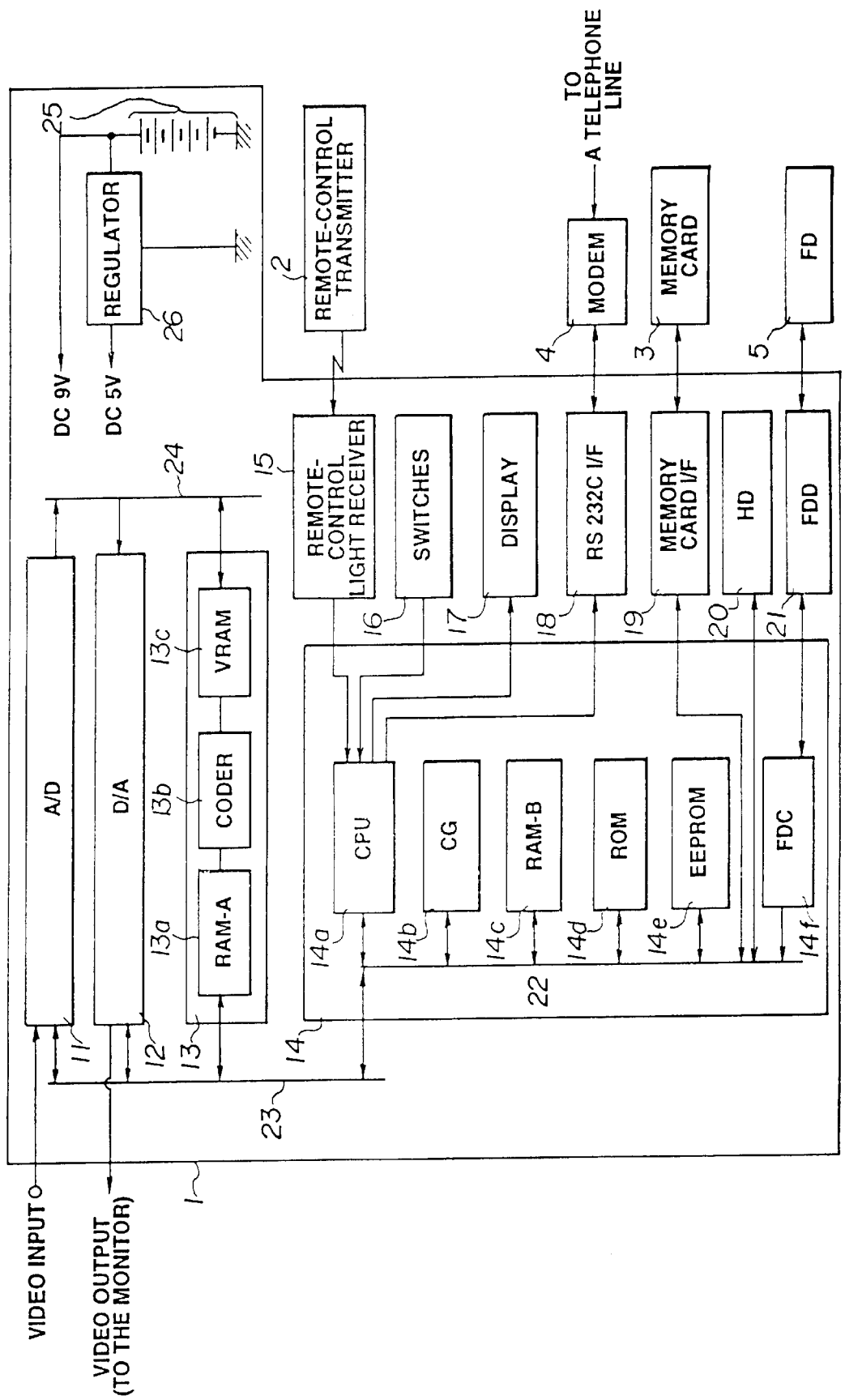
FIG. 1 is a block diagram showing a structure of an image recording/reproducing system, which acts as an image manipulating system of an embodiment of the present invention, with a remote-control transmitter, a modem, and others connected.

FIG. 1 is a block diagram showing a structure of an image recording/reproducing system, which acts as an image manipulating system of an embodiment of the present invention, with a remote-control transmitter and others connected.

Types of recording media applicable for image information to a recording/reproducing system 1 include, as shown in FIG. 1, a memory card 3, a floppy disk (FD in FIG. 1) 5, and a hard disk (HD in FIG. 1).

The image recording/reproducing system 2 of this embodiment comprises an A/D converter 11 for converting a supplied analog video signal into a digital signal to be written in a video RAM (hereinafter, VRAM) 13c, a D/A converter 12 for outputting a video signal to a monitor or the like, an image data memory 13 having the built-in VRAM 13c, data/address buses 22 and 23, a video bus 24, a recording/reproducing control unit 14, a remote-control light receiver 15 for receiving infrared light transmitted from the remote-control transmitter 2 and outputting the transmitted signal to a CPU 14a, operation switches 16 that comprise switch buttons arranged on a front panel 1a (See FIG. 2) of a main unit of the system, a display 17 composed of LEDs for indicating operational states of the recording/reproducing system 1 and arranged on the panel 1a, an RS232C interface (I/F in FIG. 1) 18 that is a serial interface circuit connected to the modem 4, a memory card interface (I/F in FIG. 1) 19 that is a memory card interface circuit connected to the memory card 3, a hard disk drive unit 20, a floppy disk drive unit (FDD in FIG. 1) 21, batteries 25 realizing a power supply of 9 VDC or 5 VDC, and a voltage regulator 26.

The foregoing data/address buses 22 and 23 serve as signal transmission buses linking between the memory card interface 19 and the control unit 14, and between the control unit 14 and the RAM-A 13a in the image data memory 13, D/A converter 12, and A/D converter 11.

The video bus 24 serves as a video signal transmission bus connecting between the VRAM 13c in the image data memory 13 and the D/A converter 12 or A/D converter 11.

The recording/reproducing control unit 14 controls circuit elements constituting the system and inputs a signal sent from the remote-control light receiver 15 and the output signals of the operation switches 16. The recording/reproducing control unit 14 comprises the CPU 14a having a built-in interval recording means and being responsible for control, a CG circuit 14b for outputting character data to be superposed on a video signal, a RAM-B 14c for storing data temporarily, a ROM 14d for storing various control algorithms, an EEPROM 14e for storing various data including recording time intervals for interval recording so as to make the data available with power off, and a floppy disk drive controller (FDC in FIG. 1) 14f for controlling the floppy disk drive 21.

The image data memory 13 comprises the RAM-A 13a into which image data is fetched temporarily via the data/address bus 23 or a coder 13b to be described later, the coder 13b for compressing or decompressing image data, and the VRAM 13c into which a video signal is fetched via the video bus 24 or coder 13b.

Figure 2:
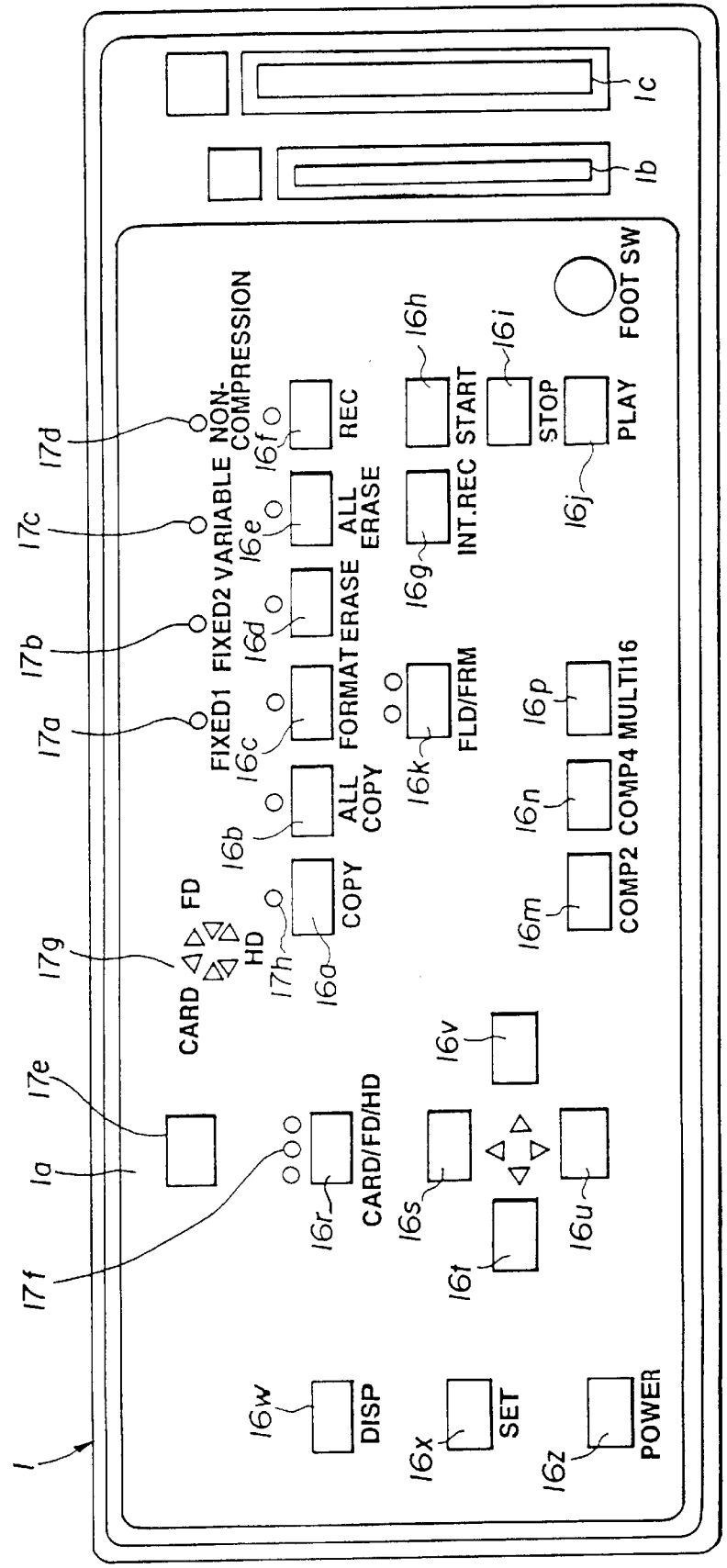
FIG. 2 shows a layout of a front panel of the image recording/reproducing system shown in FIG. 1.

FIG. 2 shows a layout of the switch buttons of operation switches 16, LED indicators 17, and slots 1b and 1c with eject buttons, into which the memory card 3 and floppy disk 5 are loaded, on the front panel 1a of the image recording/reproducing system 1.

Buttons and indicators arranged on the panel 1a except fort the slots 1b and 1c for loading recording media are a POWER switch 16z that is a power switch button, a Disp switch 16w that is a character display switch button, a Set switch 16x that is a switch button for setting conditions for, for example, compression or non-compression of image data, an LED display 17e for displaying a frame number to be reproduced or recorded, a Card/FD/HD switch 16r that is a switch button for selecting a type of recording medium, an LED array 17f for indicating a selected type of recording medium, and an Up switch 16s for designating "upward," a Down switch 16u for designating "downward," a Right switch 16v for designating "rightward," and a Left switch 16t for designating "leftward," which are general-purpose arrow select switch buttons.

Also arranged on the front panel 1a are a transfer direction indication LED array 17g for indicating recording media acting as a source and destination of image data to be copied, LED indicators for indicating conditions for compression and non-compression of image data; that is, Fixed 1 and Fixed 2 indicators 17a and 17b for indicating compression under fixed 1 and 2 conditions, a Variable indicator 17c for indicating variable length compression, and a Non-compression indicator 17d for indicating that compression is not performed, a Copy switch 16a that is a switch button for copying image data of one screen into a recording medium, an All Copy switch 16b that is a switch button for copying all image data from one recording medium into another recording medium, a Format switch 16c that is a switch button for formatting a recording medium, an Erase switch 16d that is a switch button for erasing image data of one screen, an All Erase switch 16e that is a switch button for erasing all image data, a Rec switch 16f that is a switch button for designating a recording mode for recording image data, an IntRec switch 16g that is a switch button for designating an interval recording mode, a Play switch 16j that is a switch button for designating a reproduction mode, a Start switch 16h that is a switch button for activating the Copy to IntRec processing and the Play processing which are placed in a standby state because the associated switches 16a to 16g and 16j are pressed, and a Stop switch 16i that is a switch button for stopping the above processing.

Also arranged on the front panel 1a are a Fld/Frm switch 16k that is a switch button for designating whether image data is recorded field by field or frame by frame, a Comp2 switch 16m that is a switch button for designating dual-screen display as a multi-screen display reproduction mode, a Comp4 switch 16n that is a switch button for designating quadruple-screen display, a Multi16 switch 16p that is a switch button for designating 16-division display, and LEDs 17h for indicating whether the Copy to Rec switches 16a to 16f are pressed.

Recording, reproducing, interval recording, and copying to be executed in the image recording/reproducing system 1 of this embodiment having the aforesaid configuration will be described using the flowcharts.

Figure 3:
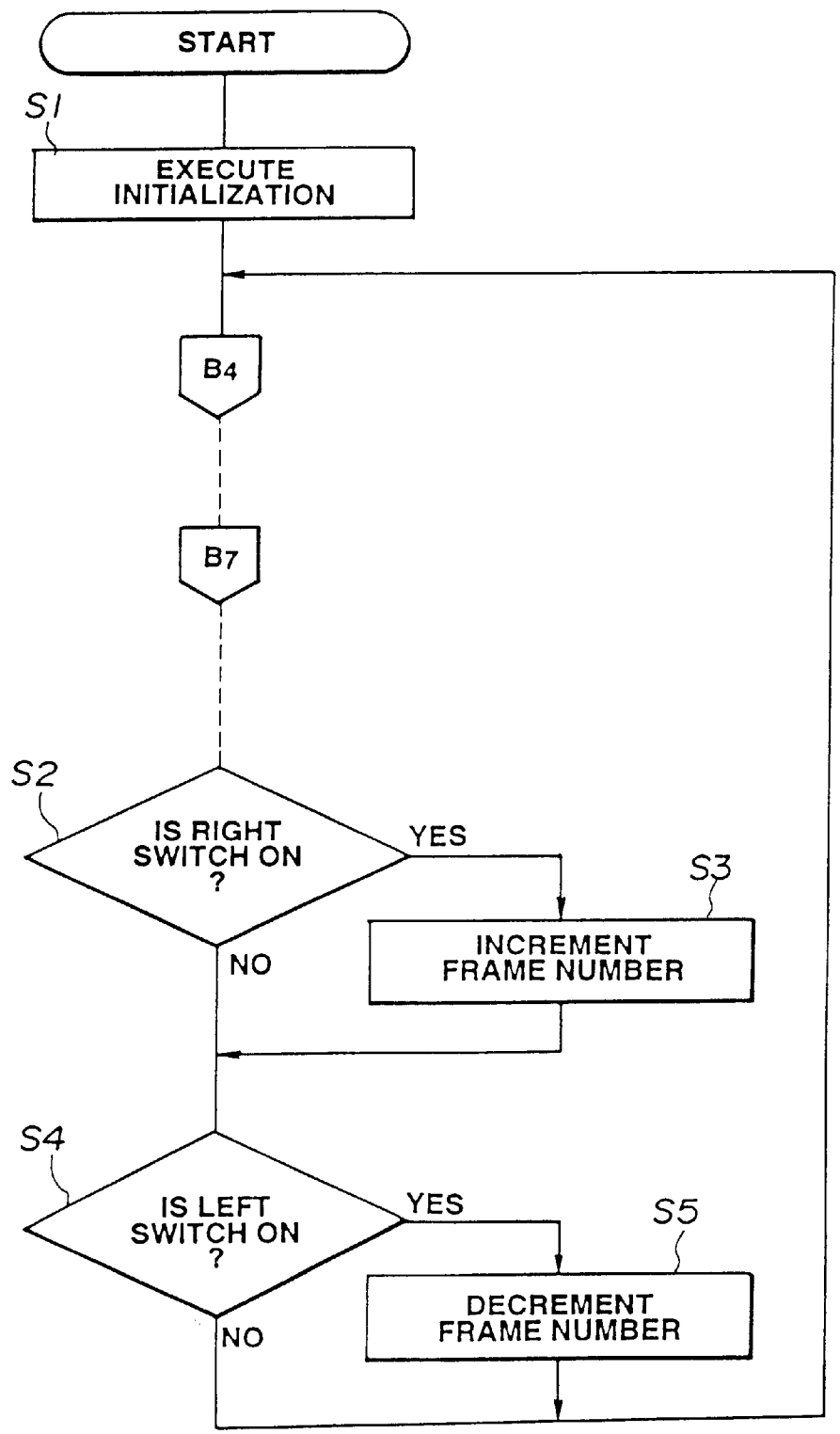
FIG. 3 is a flowchart of a main routine running in the recording/reproducing system in FIG. 1.

FIG. 3 is a flowchart showing a main routine of control operations in the recording/reproducing system. This processing starts with the Power switch 16z on. First, initialization is executed at step S1. Initialization sets 1 as a frame number for image data in the memory card 3 or floppy disk 5 which is to be recorded or reproduced. At respective branches B4 to B7, processing associated with the switches are executed. When any switch is not pressed, it is checked if the Right or Left switch 16v or 16t is on or off at step S4 or S4. If the Right or Left switch is on, the frame number is incremented or decremented. The resultant frame number then appears on the LED display 17e on the front panel 1a. Control is then returned to branch B4.

Figure 4:
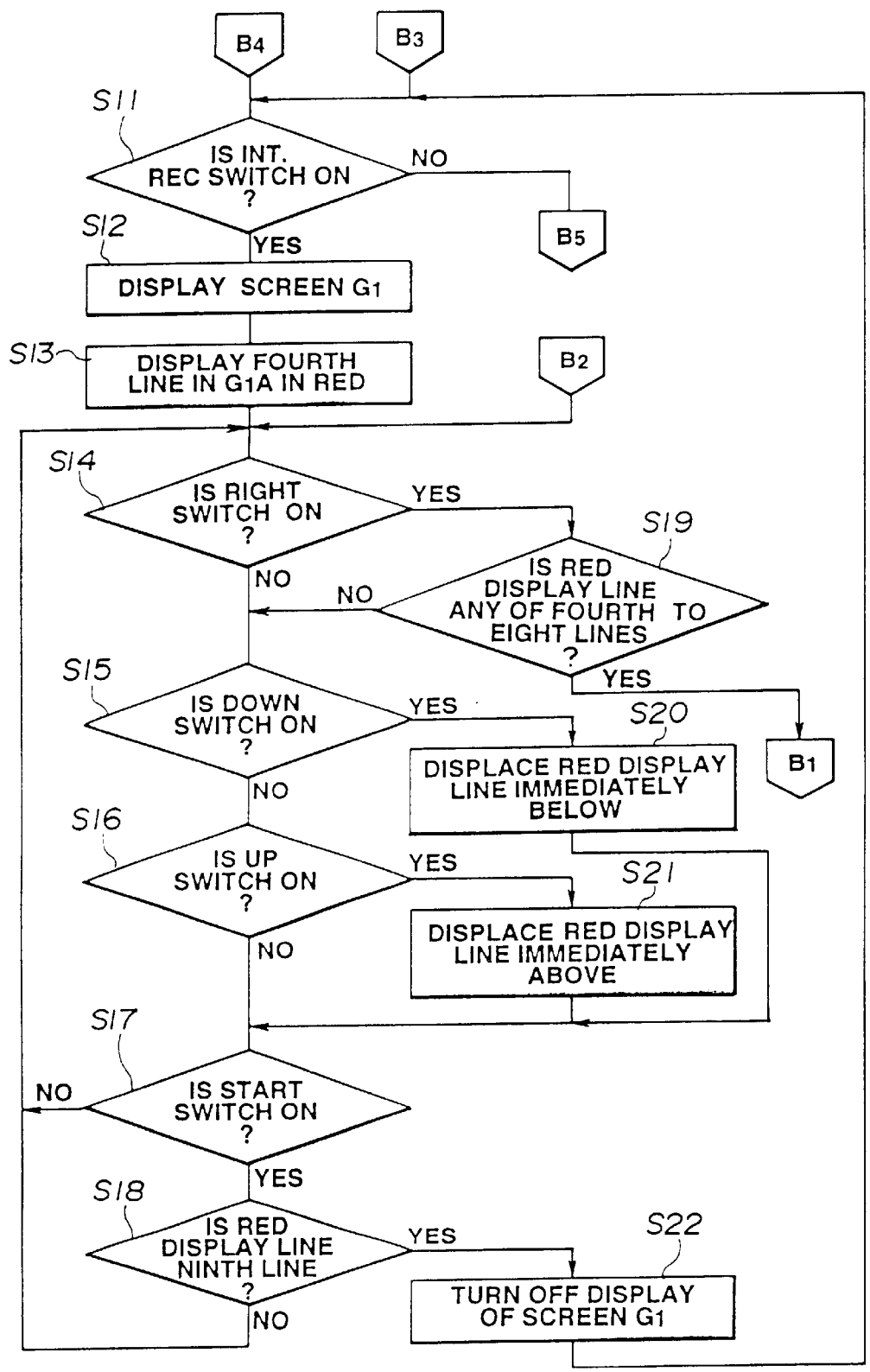
FIG. 4 is a flowchart showing a sequence initiated at branch B4 in the flowchart of the main routine in FIG. 3.

When control is passed to step S11 in the flowchart shown in FIG. 4 via branch B4, conditions for interval recording are set. More particularly, it is checked at step S11 if the IntRec switch 16g is on or off. If the IntRec switch 16g is off, control is passed to branch B5 in FIG. 7 which will be described later. If the IntRec switch 16g is on, control is passed to step S12.

Figure 21:
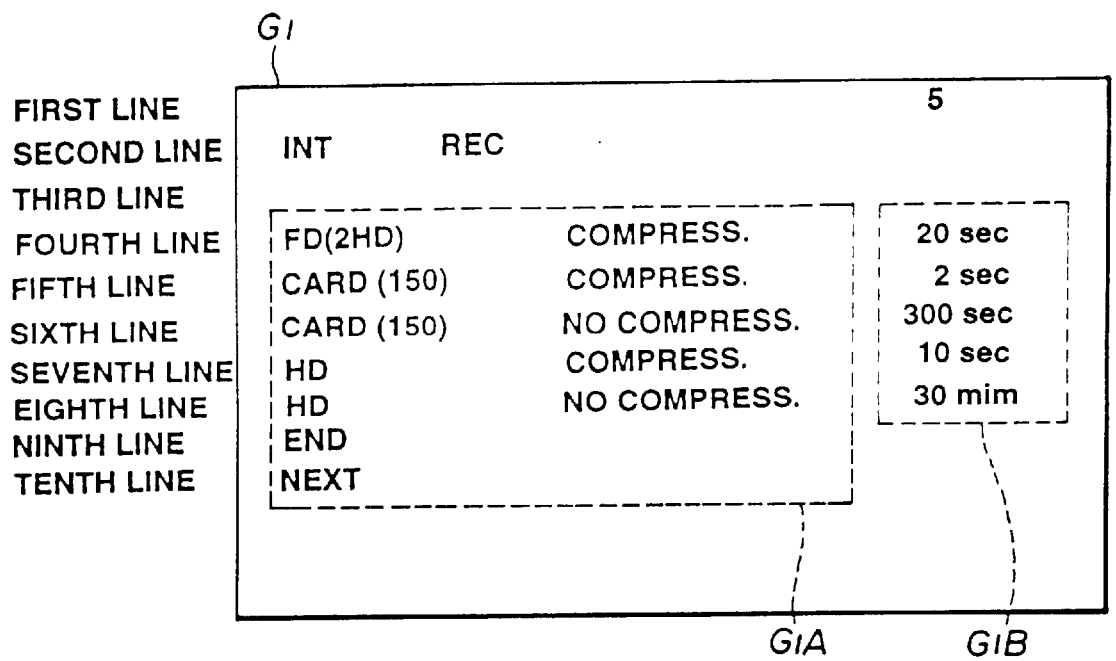
FIG. 21 shows an example of a menu screen for interval recording in the image recording/reproducing system in FIG. 1.

At step S12, a menu screen G1 shown in FIG. 21 is displayed on a monitor when the screen information is output to the monitor via the D/A converter 12. This screen shows INT REC standing for interval recording (second line), the number of frames to be recorded (first line), and selective current values of recording time intervals for interval recording (fourth to eighth lines) which are associated with types of recording media and accompanied by specification of either data compression (COMPRESS.) or non-compression (NO COMPRESS.). The number of frames to be recorded can be set by means of remote control.

The selective recording time intervals for interval recording can be designated for each of the types of recording medium depending on compression or non-compression by taking into account the access times permitted by the types of recording medium. For example, ranges listed in Table 1 are selective. A lower limit of time intervals listed in Table 1 is a value indicating a limit by which interval recording can be performed in terms of the access time of each type of recording medium. Selection of a time interval smaller than the limit value is not allowed by a ruling means incorporated in the CPU 14a.

In Table 1, a set constant for non-compression is not specified with respect to a floppy disk or one type of recording medium. This is because even if interval recording is performed on a floppy disk in a non-compression mode, since a floppy disk has a mere storage capacity of one or two screens, the system itself inhibits the interval recording of a floppy disk. Alphanumeric characters in parentheses following Floppy disk in Table 1 denote natures of floppy disks in terms of storage capacities thereof. Values in parentheses following Memory card in Table 1 denote access times. As soon as a recording medium is loaded, the system autonomously determines whatever of the types of recording medium listed in Table 1 is used.

TABLE 1

| Type of recording medium | | Compression or non-compression | Range of set constants of recording time intervals |
|---|---|---|---|
| Floppy disk | (2DD) | Compression | 20 sec to 60 min |
| | (2HD) | Compression | 10 sec to 60 min |
| | (2ED) | Compression | 10 sec to 60 min |

TABLE 1-continued

| Type of recording medium | Compression or non-compression | Range of set constants of recording time intervals |
|---|---|---|
| Memory card (100 to 200 nsec) | Compression | 0.5 sec to 60 min |
| | Non compression | 5 sec to 60 min |
| Memory card (250 to 600 nsec) | Compression | 1 sec to 60 min |
| | Non compression | 10 sec to 60 min |
| Hard disk | Compression | 2 sec to 60 min |
| | Non compression | 20 sec to 60 min |

Values that can actually be set as recording time intervals are preprogrammed practical values within the ranges in Table 1. For example, in a case where compressed data is stored in a memory card whose access time is 200 nsec, thirty values listed in Table 2 can be selectively designated. Selection of any of the values is performed at steps S36 and S37 in the flowchart of FIG. 5. If a value other than the listed values is chosen during the selection, warning may be given by sounding a buzzer or blinking an LED.

TABLE 2

| Recording medium | Set constant |
|---|---|
| Memory card (200 nsec, compression) | 0.5 (sec) |
| | 1, 2, 3, 4, 5, 6, 7, 8, 9 (sec) |
| | 10, 20, 30, 40, 50 (sec) |
| | 1, 2, 3, 4, 5, 6. 7, 8, 9 (min) |
| | 10, 20, 30, 40, 50, 60 (min) |

After the menu screen G1 is displayed at step S12 in FIG. 4, control is passed to step S13. The fourth line (FD (2HD) COMPRESS.) in a display area G1A in the screen G1 is colored in red. Control is then passed to step S14. It is checked if the Right switch 1Gv is on or off. If the Right switch 16v is on, control is passed to step S19. It is checked what is a red display line. If the red display line is any of the fourth to eighth lines, control is passed to step S31 in FIG. 5 via branch B1 which will be described later. If the red display line is none of the fourth to eighth lines, control is passed to step S15.

At step S15, it is checked if the Down switch 16u is on or off. If the Down switch 16u is off, control is passed to step S16. If the Down switch 16u is on, control is jumped to step S20. The red display line is displaced immediately below. Control is then passed to step S17 which will be described later.

At step S16, it is checked if the Up switch 16s is on or off. If the Up switch 16s is off, control is passed to step S17. If the Up switch 16s is on, control is jumped to step S21. The red display line is then displaced immediately above. Control is then passed to step S17. The movable range of the red display line to be displaced at steps S20 and S21 is within the fourth to tenth lines.

At step S17, it is checked if the Start switch 16j is on or off. If the Start switch 16j is off, control is returned to step S14. If the Start switch 16j is on, control is passed to step S18. It is then checked if the ninth line in the menu screen G1 appears in red. If the ninth line is not displayed in red, control is returned to step S14. If the ninth line appears in red, control is Jumped to step S22. It is determined that recording time interval setting is released. The display of the menu screen G1 is then turned off. Control is then returned to step S11.

Figure 5:
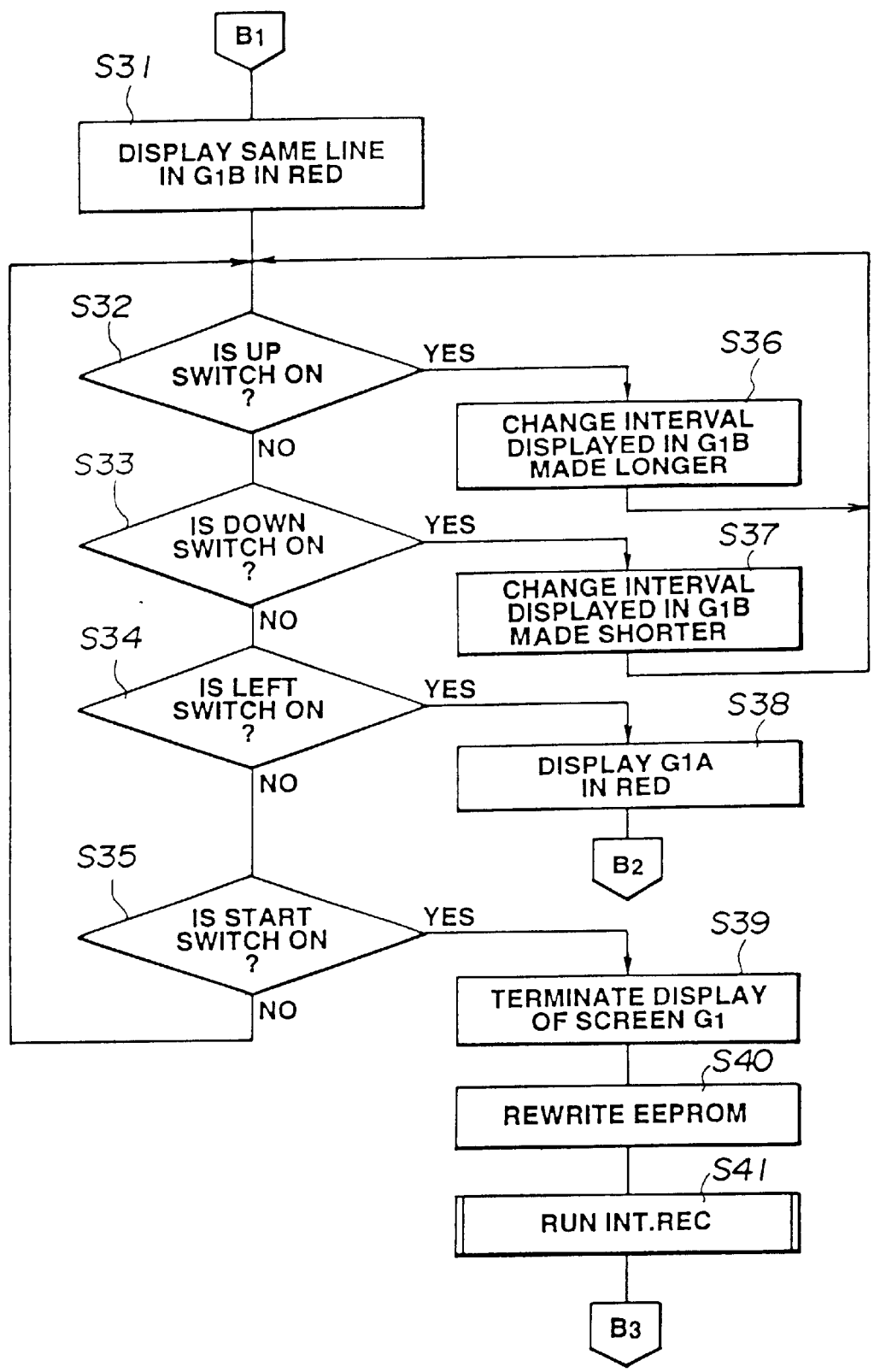
FIG. 5 is a flowchart showing a sequence initiated at branch B1 in the flowchart of the main routine in FIG. 3.

When control is passed to branch B1 as a result of the check made at step S19, processing initiated at step S31, which will be described hereinafter, is executed according to the flowchart in FIG. 5. In other words, the same line in a display area G1B as the red display line in the area G1A in the screen G1 is displayed in red at step S31. At steps S32 and 33, it is checked if the Up switch 16s and Down switch 16u, that are the direction switch buttons, are on or off. If the Up switch 16s or Down switch 16u is on, the constant of a recording time interval for the recording medium appearing on the red display line in the display area G1B is changed to longer time or shorter time to equal to one of the values listed in Table 2. Control is then returned to step S32. At step S34, it is checked if the Left switch 16t is on or off. If the Left switch 16t is on, control is jumped to step S38. The display area G1A is displayed in red. Control is then returned to step S14 in FIG. 4 via branch B2. Medium specification or other processing is executed. If the Left switch 16t is off, control is passed to step S35.

At step S35, it is checked if the Start switch 16h is on or off. If the Start switch 16h is off, control is returned to step S32. If the Start switch 16h is on, the display of the menu screen CG is terminated at step S39 so that interval recording can be executed. At step S40, a predetermined value of recording time interval is written in the EEPROM 14e. Therefore, even if the Power switch 16z were turned off, the predetermined value can be re-set effortlessly.

Next, control is passed to step S41. Subroutine IntRec which will be described later is called. Interval recording is then executed at set time intervals. Thereafter, control is returned to step S11 in FIG. 4 via branch B3.

Figure 6:
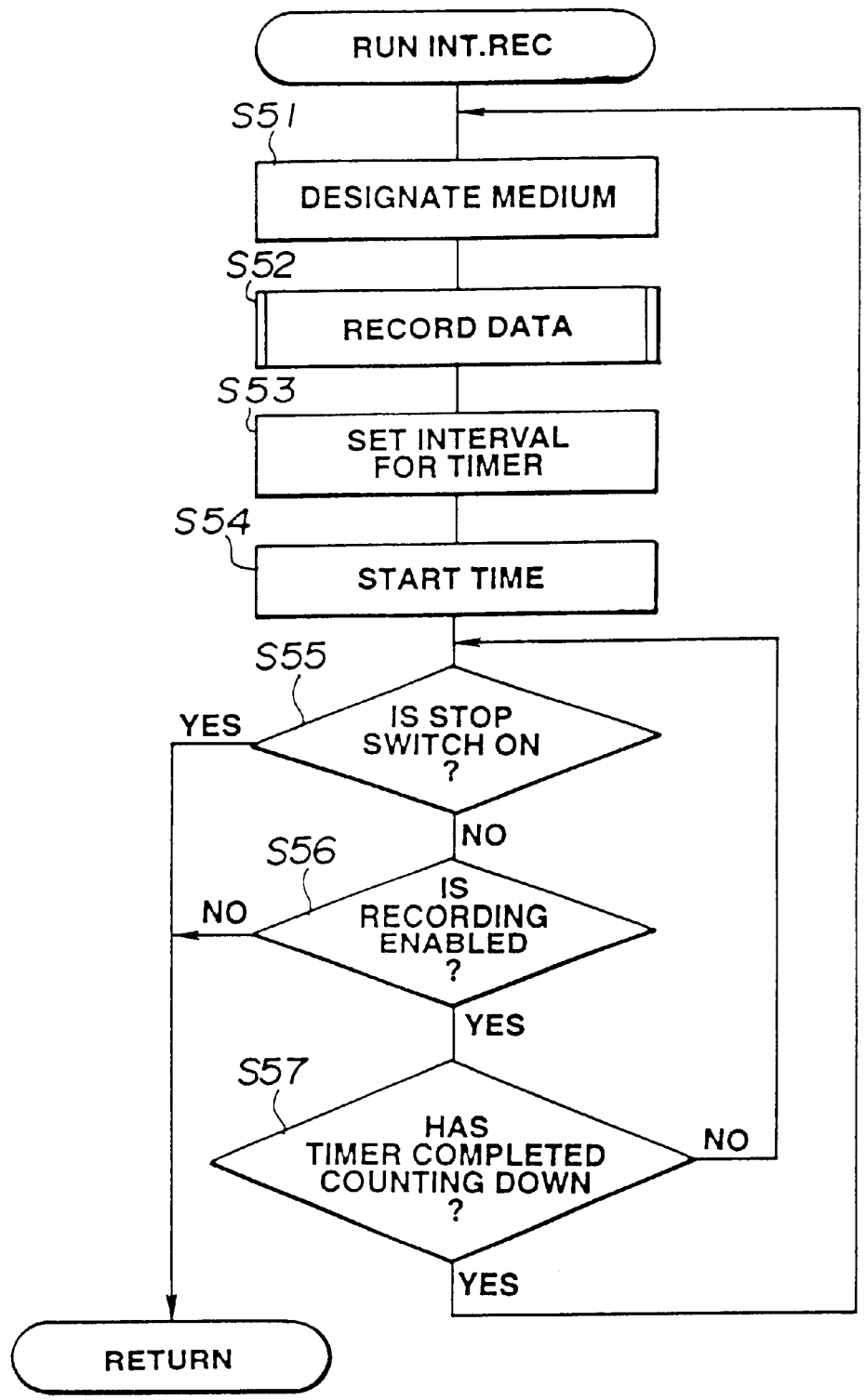
FIG. 6 is a flowchart showing the subroutine IntRec called by the main routine in FIG. 5.

FIG. 6 is a flowchart showing subroutine IntRec. In this processing, first, medium specification is executed at step S51. At step S52, subroutine Recording is called. Image data recording is then executed. Control is then passed to step S53. A constant is then set for a timer according to the predetermined recording time interval. At step S54, the timer is started to count down.

At step S55, it is checked if the Stop switch 16i is on or off. If the Stop switch 16i is on, the subroutine is terminated. If the Stop switch 16i is off, control is passed to step S56. It is then determined whether recording can be continued in terms of the number of remaining frames. If recording cannot be continued, the subroutine is terminated. If recording can be continued, control is passed to step S57. It is then checked if the timer stops counting down. Control is then returned to step S55. If the timer completes counting down, the subroutine terminates.

As described above, in this system, recording time intervals exceeding the access speed permitted by a concerned type of recording medium are ruled out. Thus, interval recording can be executed at desired time intervals at which the properties of a recording medium can be exploited fully.

Figure 7:
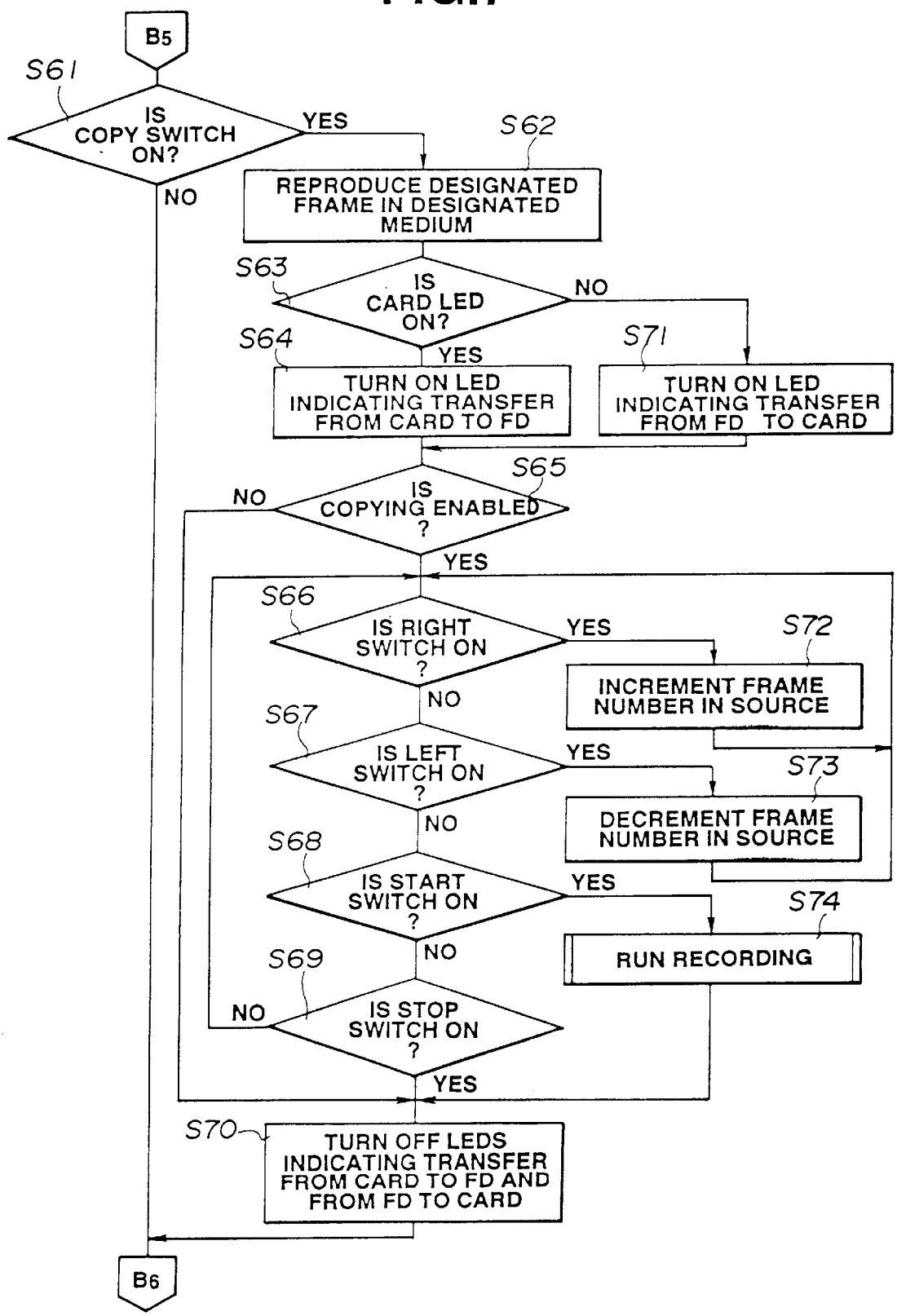
FIG. 7 is a flowchart showing a sequence initiated at branch B5 in the flowchart of the main routine in FIG. 3.

As described previously, when it is found at step S11 in FIG. 4 that the IntRec switch 16g is off, control is passed to step S61 in the flowchart of FIG. 7 via branch B5. It is then checked if the Copy switch 16a is on or off. If the Copy switch 16a is off, control is passed to step S81 in FIG. 8 via branch B6. If the Copy switch 16a is on, control is passed to step S62. Copying is then executed.

First, at step S62, a designated frame in a first medium, which serves as a copy source, having been designated at steps S3 and S5 in FIG. 3 is reproduced and displayed on the monitor. At step S63, it is checked if the LED 17f associated with the memory card 3 lights. If the LED 17f lights, the one of the transfer indication LEDs 17g indicating data transfer from a card memory to a floppy disk is lit at step S64. If the LED 17f does not light, the one of the transfer indication LEDs indicating data transfer from a floppy disk to a memory card is lit at step S71.

At step S65, it is determined whether copying can be executed in terms of whether recording image data in a second medium serving as a transfer destination is disabled and what is the number of frames representing a remaining capacity. If copying cannot be executed, control is jumped to step S70. The one of the transfer indication LEDs 17g indicating data transfer from a memory card to a floppy disk and the one thereof indicating data transfer from a floppy disk to a memory card are put out. Control is then passed to step S81 in FIG. 8 via branch B6. If copying can be executed, control is passed to steps S66 and S67. It is checked if the Right switch 16v or Left switch 16t is on or off. If either the Right switch 16v or Left switch 16t is on, a frame number for image data in a transfer destination is incremented (step S72) or decremented (step S73). Control is then returned to step S66. At this time, a frame number for image data in the first medium serving as a transfer source appears on the single LED display 17e. Image data associated with the frame number can be viewed when sent to the monitor via the D/A converter 12.

When it is detected at step S68 that the Start switch 16h is on, control is passed to step S74. Subroutine Recording which will be described later is run to record data existent in the first medium serving as a transfer source into the second medium serving as a transfer destination. Control is then passed to step S70. If the Start switch 16h is off, control is passed to step S69. It is then checked if the Stop switch 16i is on or off. If the Stop switch 16i is off, control is returned to step S66. If the Stop switch 16i is on, control is passed to step S70.

As mentioned above, in this system, a frame number for image data in a copy destination is automatically selected during recording in FIG. 14 which will be described later. For copying, therefore, only a frame number for image data in a medium serving as a copy source need be indicated on the single LED display 17e. The system configuration can therefore be simplified. Irrelevant of raw image information, the simplification will not inconvenience any user.

Figure 8:
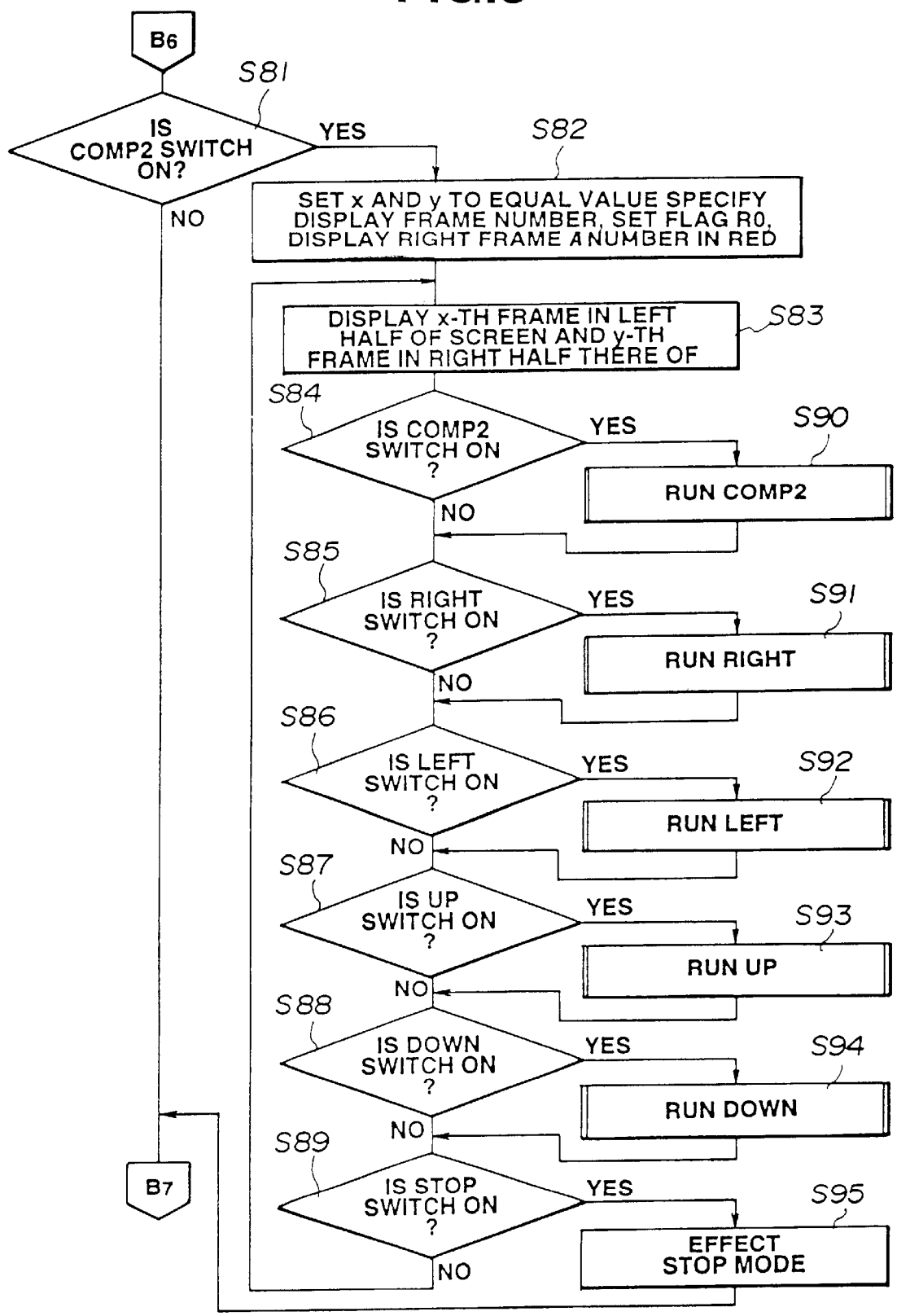
FIG. 8 is a flowchart showing a sequence initiated at branch B6 in the flowchart of the main routine in FIG. 3.

When control is jumped to step S81 in the flowchart of FIG. 8 via branch B6 in the flowchart of FIG. 7, it is checked if the Comp2 switch 16m is on or off. If the Comp2 switch 16m is off, control is returned to the main routine in FIG. 8 via branch B7. If the Comp2 switch is on, control is passed to step S82 at which one of multi-screen displaying modes; that is, dual-screen displaying for providing a screen G2 shown in FIG. 22 is initiated.

Figure 22:
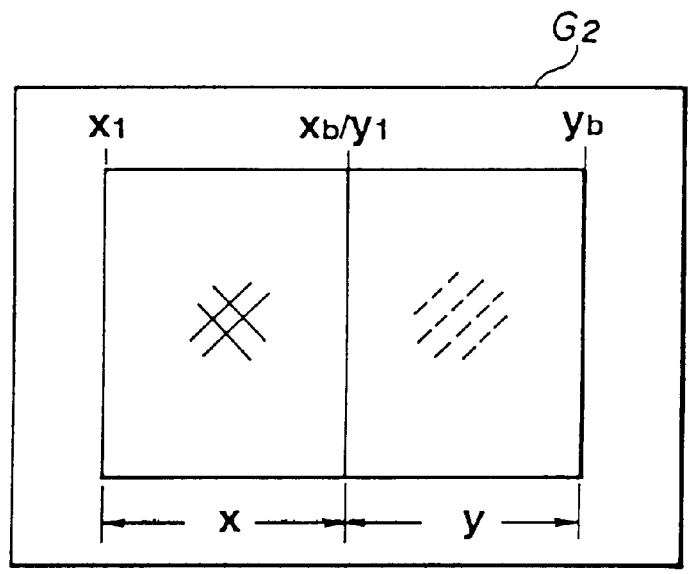
FIG. 22 is an explanatory diagram concerning dual-screen displaying involving VRAMs in the image recording/reproducing system in FIG. 1.
Figure 23:
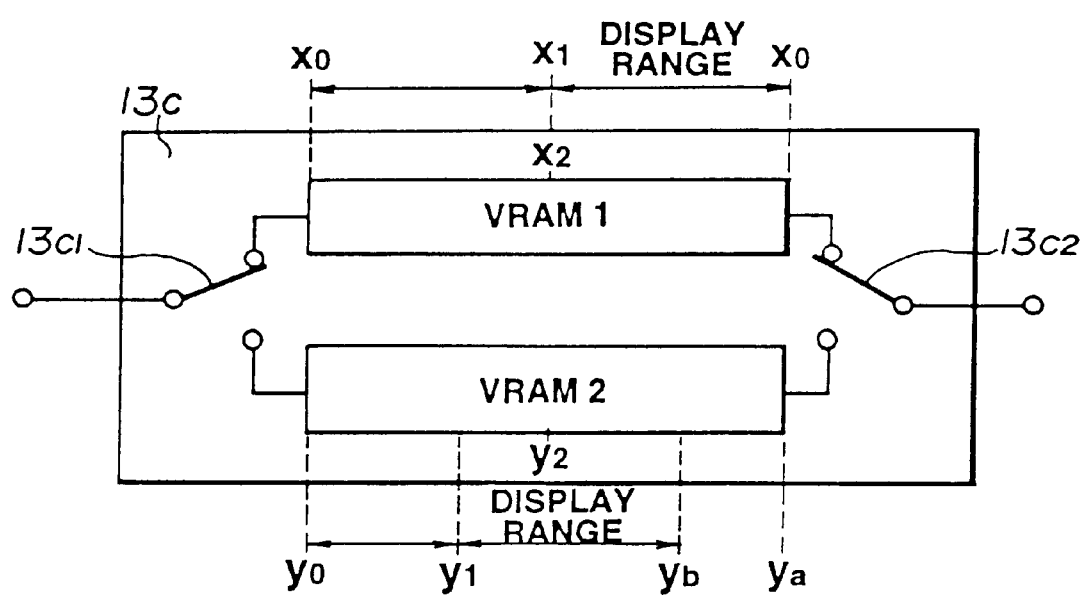
FIG. 23 shows an example of dual-screen display in the image recording/reproducing system in FIG. 1.

At step S82, the frame numbers x and y for sub-screens appearing as right and left parts of the screen G2 in FIG. 22 are set to an equal value, and a flag R0 is set to 1. The frame numbers are displayed in the screen. The right one of the frame numbers is displayed in red. The flag R0 is used as a display area specifying means for selecting and specifying right and left display areas that are one part of the display screen and the other part thereof. The left or right display area corresponds to an x area or a y area in FIG. 22. The screen display magnifications of the two sub-screens are set to be equal with each other. At step S83, the dual screen G2 shown in FIG. 22 appears on the monitor. Specifically, an x-th frame is displayed as the left half of the dual screen G2, and a y-th frame is displayed as the right half thereof.

Next, at step S84, it is checked if the Comp2 switch 16m is on or off. If the Comp2 switch is on, control is Jumped to step S90. Subroutine Comp2 is called.

Figure 9:
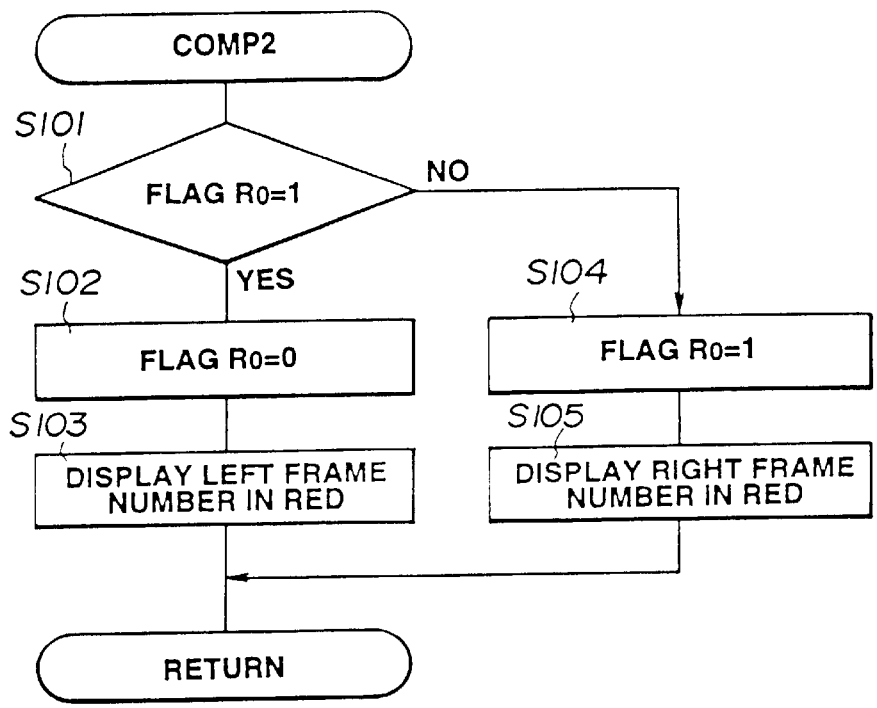
FIG. 9 is a flowchart showing the subroutine Comp2 called by the main routine in FIG. 8.

The subroutine Comp2 runs according to the flowchart shown in FIG. 9. First, the flag R0 is checked at step S101.

If the flag R0 is set to 1, control is passed to step S102. The flag R0 is then reset to 0 at step S101. At step S103, the frame number appearing above the left part of the screen is colored in red. If the flag R0 is reset to 0, control is passed to step S104. The flag R0 is then set to 1. At step S105, the frame number appearing above the right part of the screen is colored in red. The subroutine then terminates. Every time the Comp2 switch 16m is pressed, the right frame number and left frame number are alternately colored in red. Thus, the right and left display areas can be specified selectively.

If it is found at step S84 in FIG. 8 that the Comp2 switch 16m is off, control is passed to step S85 or later. At steps S85 and S86, it is checked if the Right switch 16v and Left switch 16t are on or off. If the Right switch 16v is on, control is passed to step S91. Subroutine Right is then called. When the Left switch 16t is on, control is passed to step S92. Subroutine Left is then called.

The Right or Left subroutine runs under the control of a means that executes processing for scrolling an image rendered in a display area that is part of a screen specified by the display area specifying means; such as, the x display area or y display area in FIG. 22 corresponding to an image signal produced for the display area.

Figure 10:
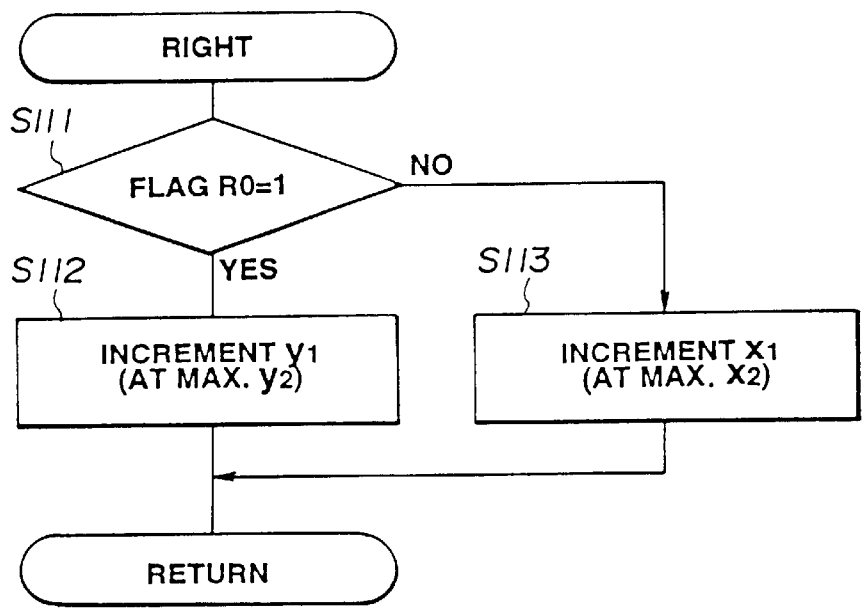
FIG. 10 is a flowchart showing the subroutine Right called by the main routine in FIG. 8.

Subroutine Right runs according to the flowchart in FIG. 10. At step S111, the flag R0 is checked. If the flag R0 is set to 1, control is jumped to step S112. When the flag R0 is set to 0 at step S111, control is jumped to step S113. At step S112, a value y1 that is a coordinate of a horizontal starting point of the y display area is incremented. At step S113, a value x1 that is a coordinate of a horizontal starting point of the x display area is incremented. After the incrementing, the subroutine terminates.

Figure 11:
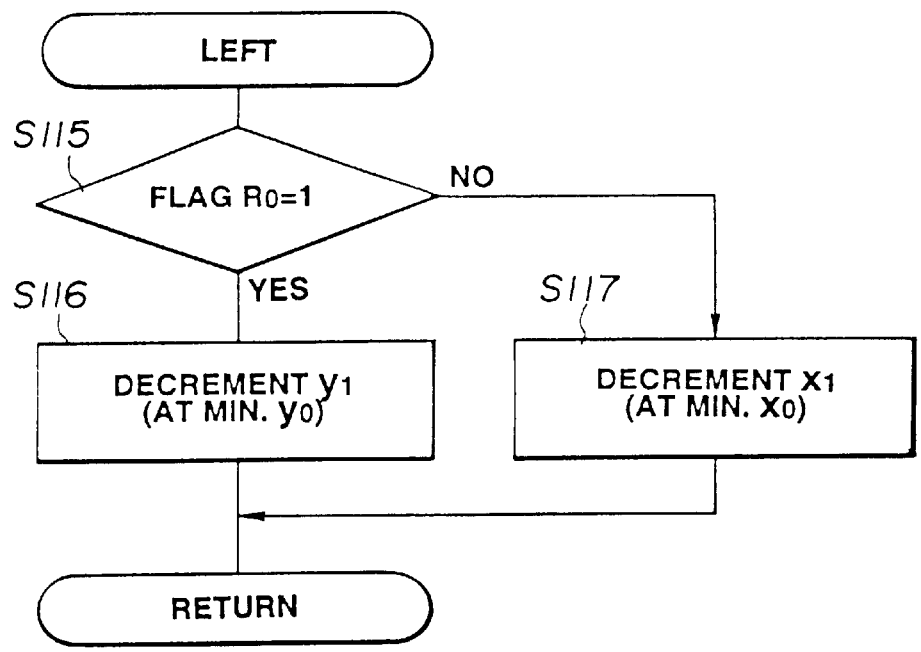
FIG. 11 a flowchart showing the subroutine Left called by the main routine in FIG. 8.

Subroutine Left runs according to the flowchart in FIG. 11. At step S115, the flag R0 is checked. If the flag R0 is set to 1, control is jumped to step S116. When the flag R0 is set to 0, control is jumped to step S117. At step to S116, the value y1 that is a coordinate of a horizontal starting point of the y display area is decremented. At step S117, the value x1 that is a coordinate of a horizontal starting point of the x display area is decremented. After the decrementing, the subroutine terminates.

The value x1 or y1 of the coordinate of the horizontal start point indicates a scroll starting point in the x or y display area of a display screen and corresponds to a horizontal coordinate in image data residing in the VRAM1 or VRAM2 associated with the x or y display area and incorporated in the VRAM 13c. Incidentally, a scroll terminus in the x or y display area of a display screen is indicated with xb or yb. The x or y display area therefore ranges from the starting point x1 or y1 to the terminus xb to yb. The value of the horizontal starting point x1 or y1 ranges from a minimum x0 or y0, which indicates the leftmost end of the VRAM1 or VRAM2 in a single-screen display mode, to a maximum x2 or y2 indicating a middle point in the single-screen display mode. When the value of the horizontal starting point x1 or y1 assumes the maximum x2 or y2, the scroll terminus xb or yb coincides with a point xa or ya that is located at the rightmost end of the VRAM1 or VRAM2 in the single-screen display mode. The output of the VRAM1 or VRAM2 is selected by means of a select switch element 13c1 or 13c2, and then fed to the D/A converter 12. Thus, dual-screen display is achieved.

In the flowchart of FIG. 8, the processing of step S85 or 86 is succeeded by that of step S87 or S88.

At steps S87 and S88, it is checked if the Up switch 16s and Down switch 16u are on or off. If the Up switch 16s is on, control is passed to step S93. Subroutine Up is then called. If the Down switch 16u is on, control is passed to step S94. Subroutine Down is then called.

Figure 12:
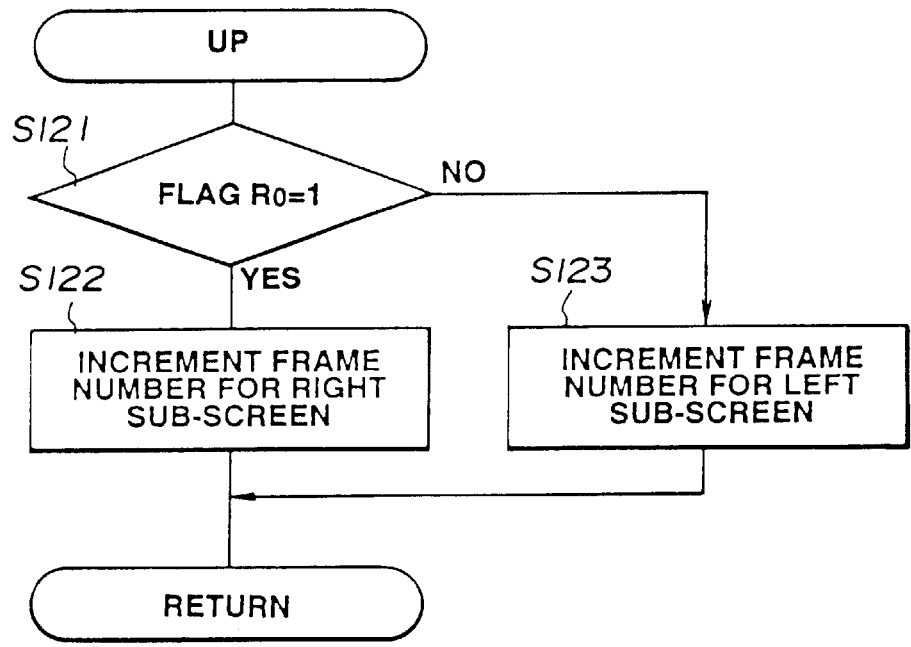
FIG. 12 is a flowchart showing the subroutine Up called by the main routine in FIG. 8.

The Up subroutine runs according to the flowchart in FIG. 12. At step S121, the flag R0 is checked. If the flag R0 is set to 1, control is jumped to step S122. If the flag R0 is set to 0, control is jumped to step S123. At step S122, the frame number appearing above the right sub-screen is incremented. At step S123, the frame number appearing above the left sub-screen is incremented. The subroutine then terminates.

Figure 13:
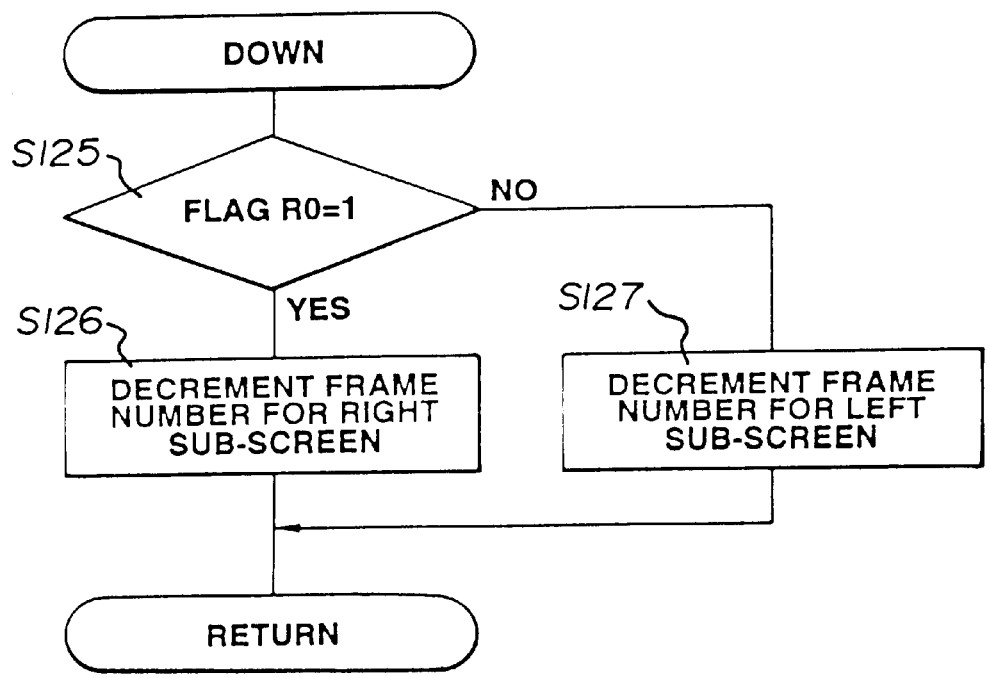
FIG. 13 is a flowchart showing the subroutine Down called by the main routine in FIG. 8.

The Down subroutine runs according to the flowchart of FIG. 13. At step S125, the flag R0 is checked. If the flag R0 is set to 1, control is jumped to step S126. If the flag R0 is set to 0, control is jumped to step S127. At step S126, the frame number appearing above the right sub-screen is decremented. At step S127, the frame number appearing above the left sub-screen is decremented. After the decrementing, the subroutine terminates.

After the processing of step S87 or S88 in FIG. 8, control is passed to step S89. It is checked if the Stop switch is on or off. If the Stop switch is off, control is returned to step S83. If the Stop switch is on, control is passed to step S95. A stop mode is effected by, for example, stopping dual-screen displaying. Control is then branched at branch B7. Subsequent processing is then executed.

As described above, during the dual-screen displaying, the Up switch 16s or Down switch 16u is pressed to designate two image data having two frame numbers, and the image data are displayed in two sub-screens separately. The Comp2 switch 16m is then used to designate the right sub-screen or left sub-screen. Thereafter, the Right switch 16v or Left switch 16t is turned on or off, so that the right or left sub-screen can be scrolled to display any division of one screen in full size. Consequently, the right and left sub-screens, especially, areas near a boundary or ends of both the sub-screens can be compared with each other effortlessly. In this system, a screen is divided laterally. The present invention is not limited to this working mode but may apply to vertically-divided multi-screen display or division display providing two or more sub-screens.

Subroutine Recording, which is called at step S52 in subroutine IntRec shown in FIG. 6, at step S74 in Copying initiated at branch B5 in FIG. 7, or during normal recording, will be described in conjunction with the flowchart in FIG. 14.

In the Recording subroutine, a directory to be recorded is selected automatically. First and second recording modes are available. In the first recording mode, all directories including those from which image data are deleted do searched to retrieve directories that are not have recorded image data. A directory having the smallest directory number is then specified. The first recording mode enables effective use of directories. In the second recording mode, a directory succeeding a directory number of a directory in or from which image data has been recorded or deleted last is specified. Deleted directories are wasted. However, the second recording mode enables recording in order of specification.

A flag R1 which will be described later is adopted as a means for selecting the first or second recording mode. For example, a value set for the flag R1 is stored in a recording medium, and a recording mode is specified by reading the value. Alternatively, a display screen for recording mode selection may be displayed successively to the menu screen G1 in FIG. 21. While the screen is being viewed, switches are pressed to change the value set for the flag R1. Thus, a recording mode may be designated. As for a flag R2 used in file name automatic production which will be described later, similar to the flag R1, a value stored in a recording medium may be read out or a value may be designated and entered in a screen.

The Recording subroutine will be described more particularly. First, at step S131 in FIG. 14, subroutine Empty Directory Number Retrieval for retrieving a directory in a recording medium, in which image data is to be recorded, is called.

Figure 15:
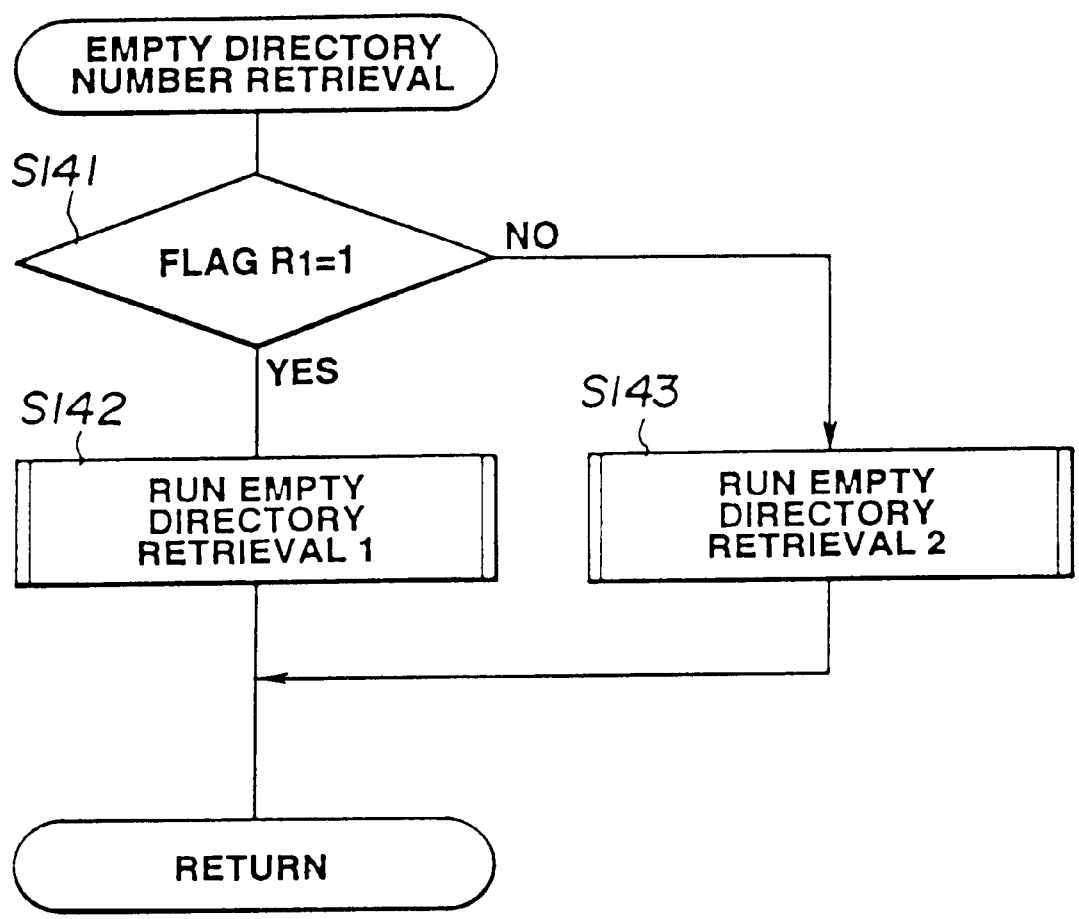
FIG. 15 is a flowchart showing the subroutine Empty Directory Number Retrieval called by subroutine Recording in FIG. 14.

The subroutine checks, as shown in FIG. 15, the flag R1 at step S141. If the flag R1 is set to 1, control is passed to step S142. Subroutine Empty Directory Retrieval 1 is called to retrieve a directory to be recorded in the first recording mode. If the flag R1 is reset to 0, control is passed to step S143. Subroutine Empty Directory Retrieval 2 is called to retrieve a directory to be recorded in the second recording mode.

Figure 16:
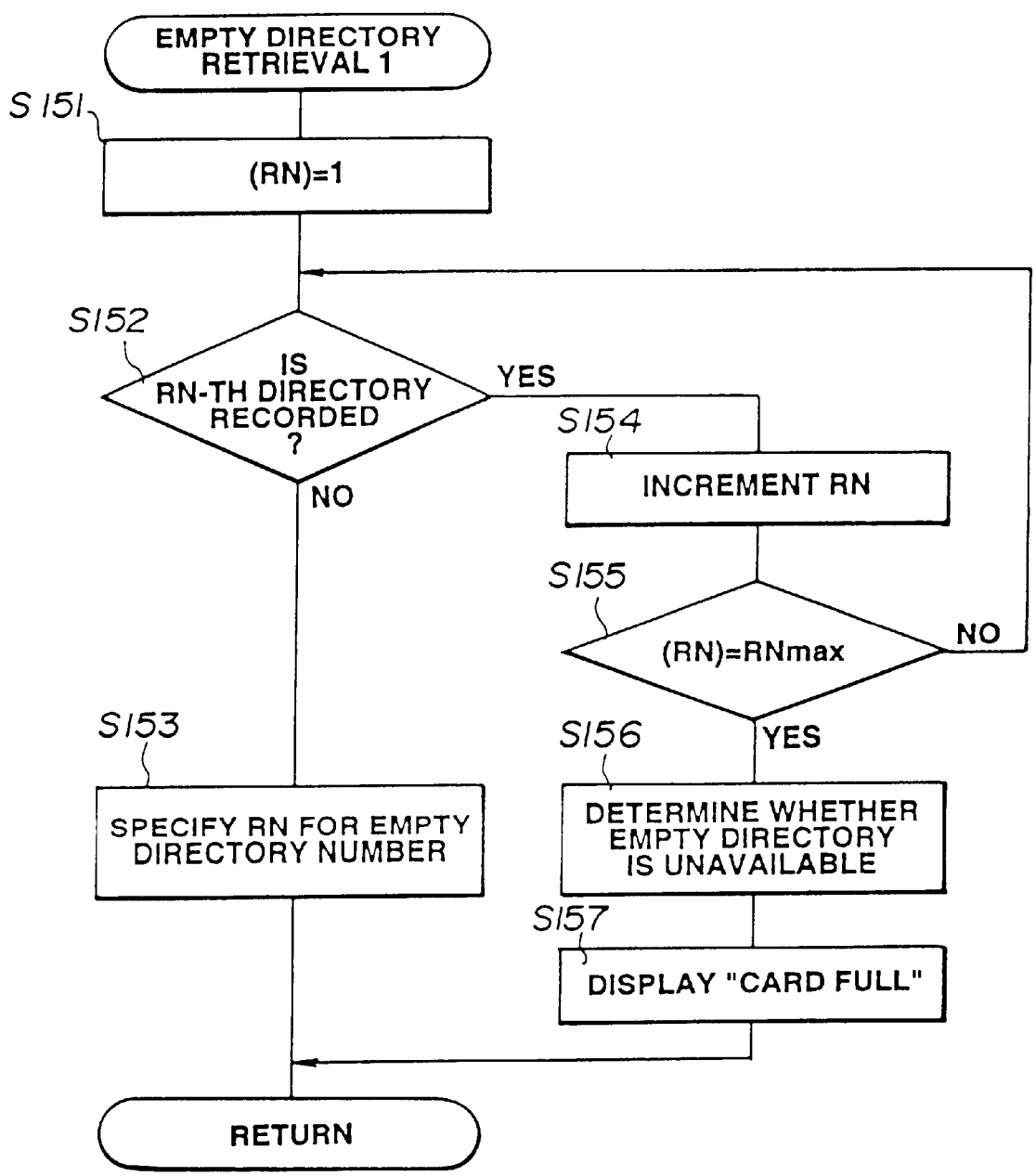
FIG. 16 is a flowchart showing the subroutine Empty Directory Retrieval 1 called by subroutine Empty Directory Number Retrieval in FIG. 15.

The Empty Directory Retrieval 1 subroutine runs according to the flowchart in FIG. 16. At step S151, 1 is set for the designated directory number RN. At step S152, it is checked if the RN-th directory has been recorded with image data. If it is determined that the RN-th directory has not been recorded, control is-passed to step S153. An empty directory number is specified as RN. The subroutine then terminates.

When it is found at step S152 that the RN-th directory has been recorded with image data, control is jumped to step S154.

At step S154, the RN value is incremented. Control is then passed to step S155. It is checked if the RN value agrees with the maximum number of frames recordable in a recording medium; that is, the maximum number of directory entries RNmax. If they disagree, control is returned to step S152. If they agree, control is passed to step S156 or S157. It is then determined that an empty directory is unavailable. CARD FULL is therefore displayed. The subroutine then terminates.

Figure 17:
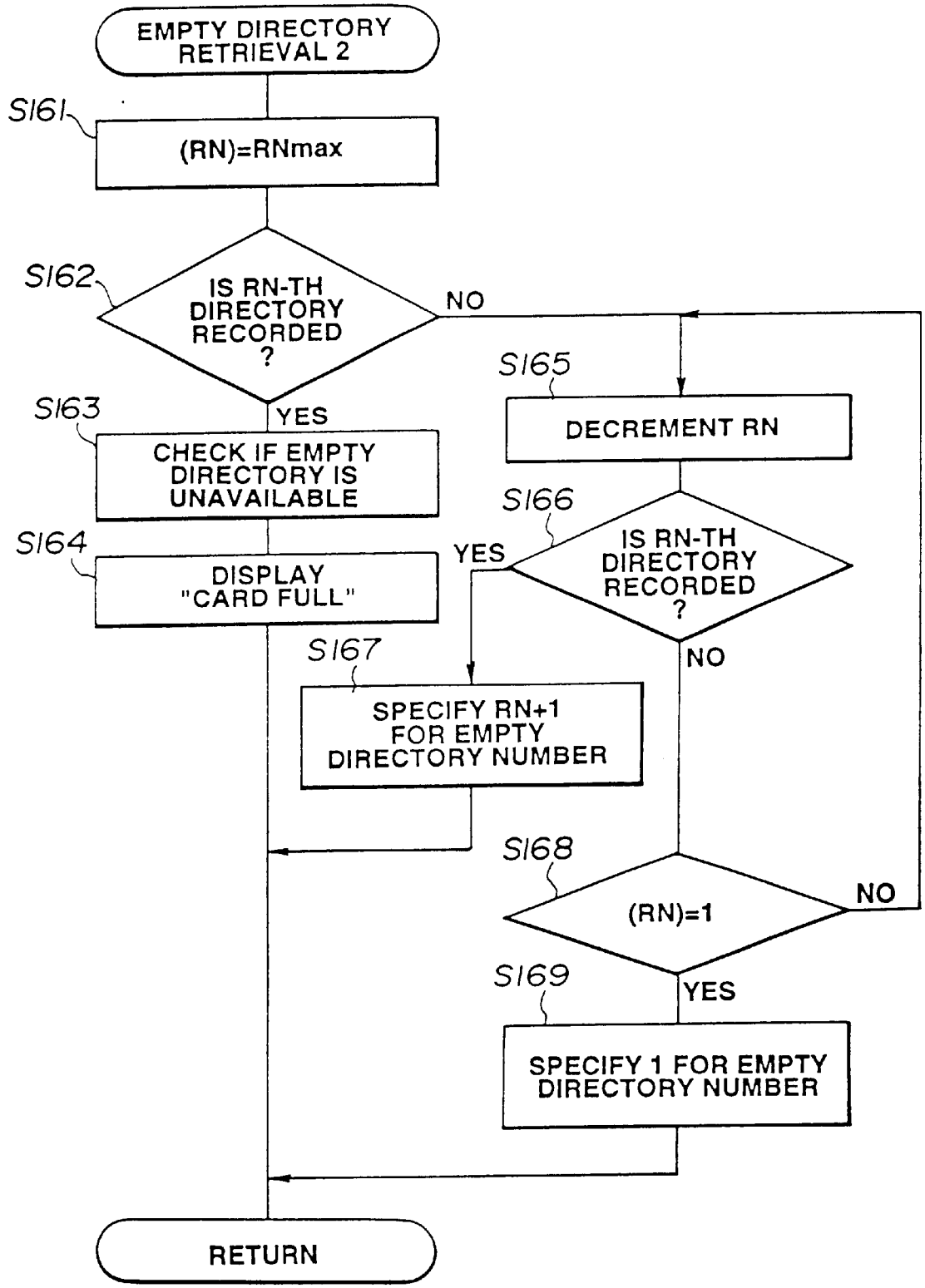
FIG. 17 is a flowchart showing the subroutine Empty Directory Retrieval 2 called by subroutine Empty Directory Number Retrieval in FIG. 15.

The Empty Directory Retrieval 2 subroutine runs according to the flowchart of FIG. 17. At step S161, the designated directory number RN is set to a value representing the maximum directory number RNmax. At step S162, it is checked if the RN-th directory has been recorded with image data. If the RN-th directory has been recorded, control is passed to step S163 or S164. It is then determined that an empty directory is unavailable. CARD FULL is therefore displayed. If it is determined at step S162 that the RN-th directory has not been recorded, control is passed to step S165.

At step S165, the RN value is decremented. Control is then passed to step S166. It is checked if the RN-th directory has been recorded with fimage data. When it is found that the RN-th directory has been recorded, it is determined that all directories ending with the RN-th directory have been recorded image data. Control is then jumped to step S167. RN+1 is specified as an empty directory number. The subroutine then terminates. When it is found at step S166 that the RN-th directory has not been recorded, control is passed to step S168. It is then checked if the RN value is 1. If the RN value is 1, it is determined that all directories have been checked and not been recorded image data. 1 is then set for the directory number RN. The subroutine then terminates. When the RN value is not 1, control is returned to step S165.

Figure 14:
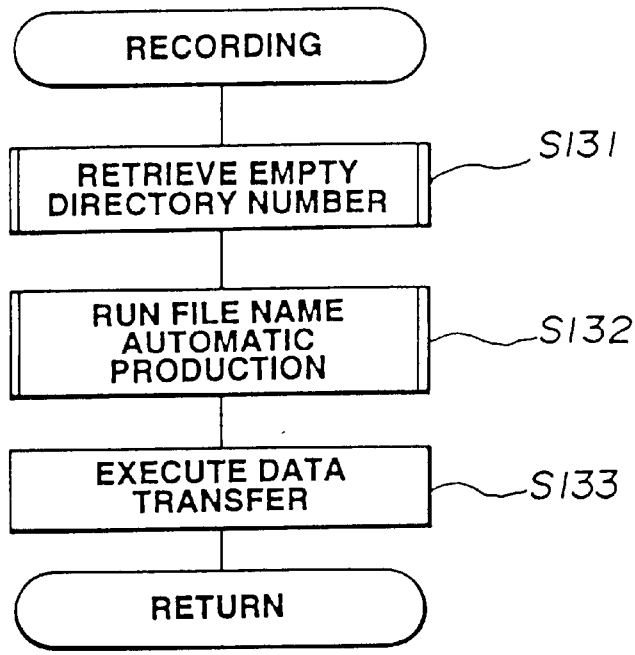
FIG. 14 is a flowchart showing the subroutine Recording called by subroutine IntRec in FIG. 6 or the main routine in FIG. 7.

Step S131 in subroutine Recording in FIG. 14 is succeeded by step S132. At step S132, subroutine File Name Automatic Production is called.

Figure 18:
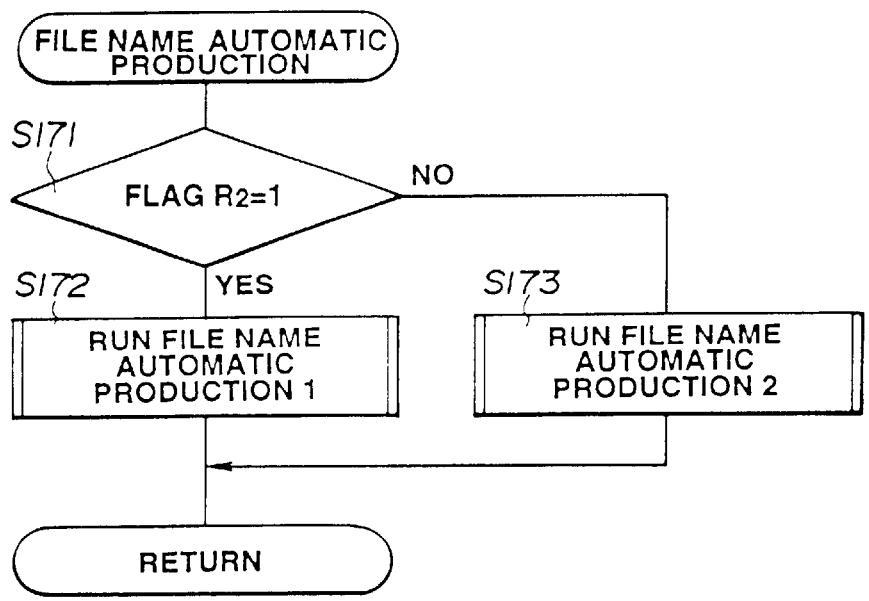
FIG. 18 is a a flowchart showing the subroutine File Name Automatic Production called by the subroutine Recording in FIG. 14.

FIG. 18 is a flowchart showing the File Name Automatic Production subroutine. The subroutine runs under the control of a means incorporated in the recording/reproducing control unit 14 and designed to assign a file name. During file name production, part of a file name is defined as arbitrarily non-designative and therefore specified automatically, while the other part is defined as arbitrarily designative.

First, at step S171, a medium is checked for a value set for the flag R2. If the value is 1, control is passed to step S172. If the value is 0, control is passed to step S173. Subroutine File Name Automatic Production 1 or File Name Automatic Production 2 is then run.

Figure 19:
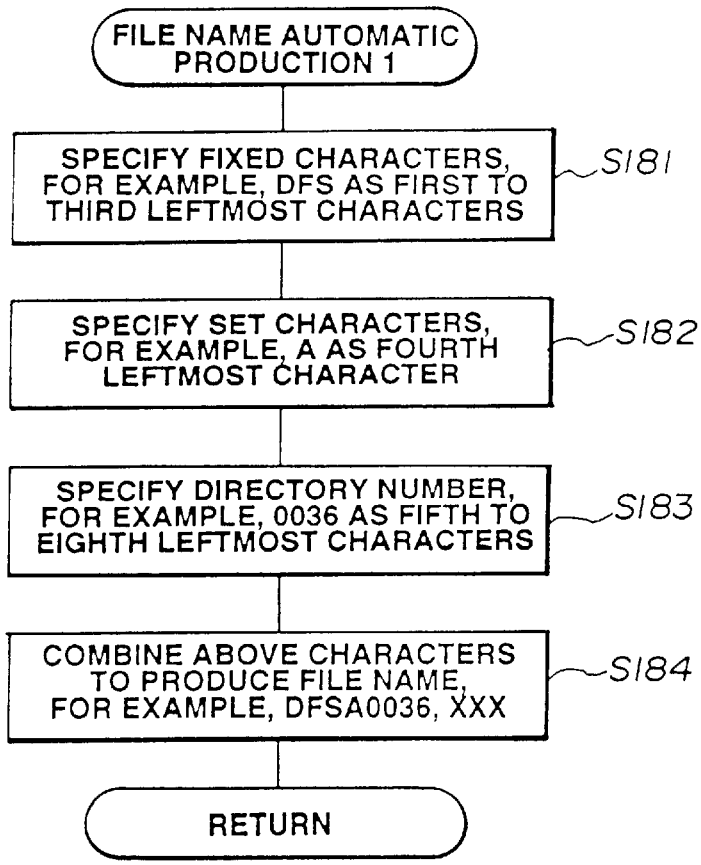
FIG. 19 is a flowchart showing the subroutine File Name Automatic Production 1 called by the subroutine Fine Name Automatic Production in FIG. 18.

The File Name Automatic Production 1 subroutine runs according to the flowchart in FIG. 19. At step S181, fixed characters, for example, DFS are specified as the first to third leftmost characters of a file name. At step S182, a character specific to the system, for example, A is specified as the fourth leftmost character thereof.

Figure 24:
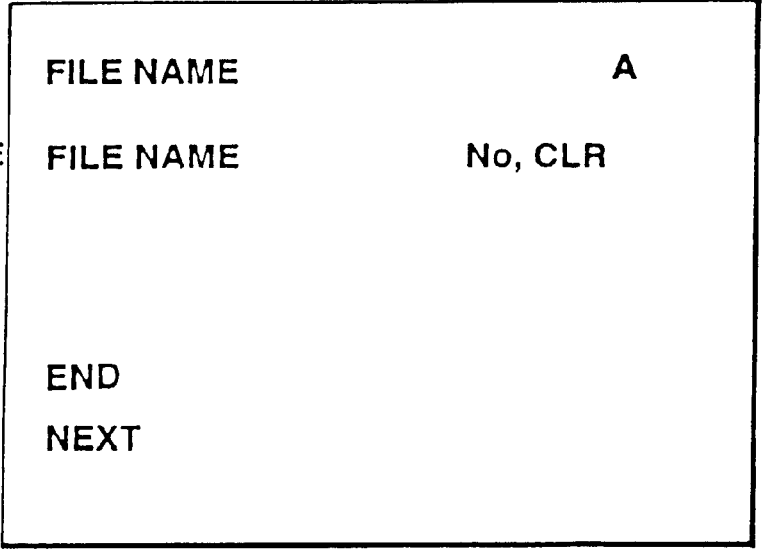
FIG. 24 shows an example of a menu screen for film name automatic production in the image recording/reproducing system in FIG. 1.

The characters can be designated in a menu screen G3 shown in FIG. 24. That is to say, the first line in the is menu screen G3 is displayed in red. The character A is changed to B, C, or the like, whereby the fourth character is designated.

At step S183 succeeding S182, an automatically-specified directory number, for example, 0036 is specified as the fifth to eighth characters. Next, at step S184, the characters specified at steps S181 to S183 are combined to produce a file name. The foregoing example provides DFSA0036.XXX. Note that XXX denotes a subordinate name of the file name.

As mentioned above, in subroutine File Name Automatic Production 1, a file name includes a directory number of a directory associated with the file. For copying image data, the system autonomously appends a directory number to a file name. An operator therefore need not rename a file name. Furthermore, an accident that an old file having the same name as a new file is deleted will not occur.

Figure 20:
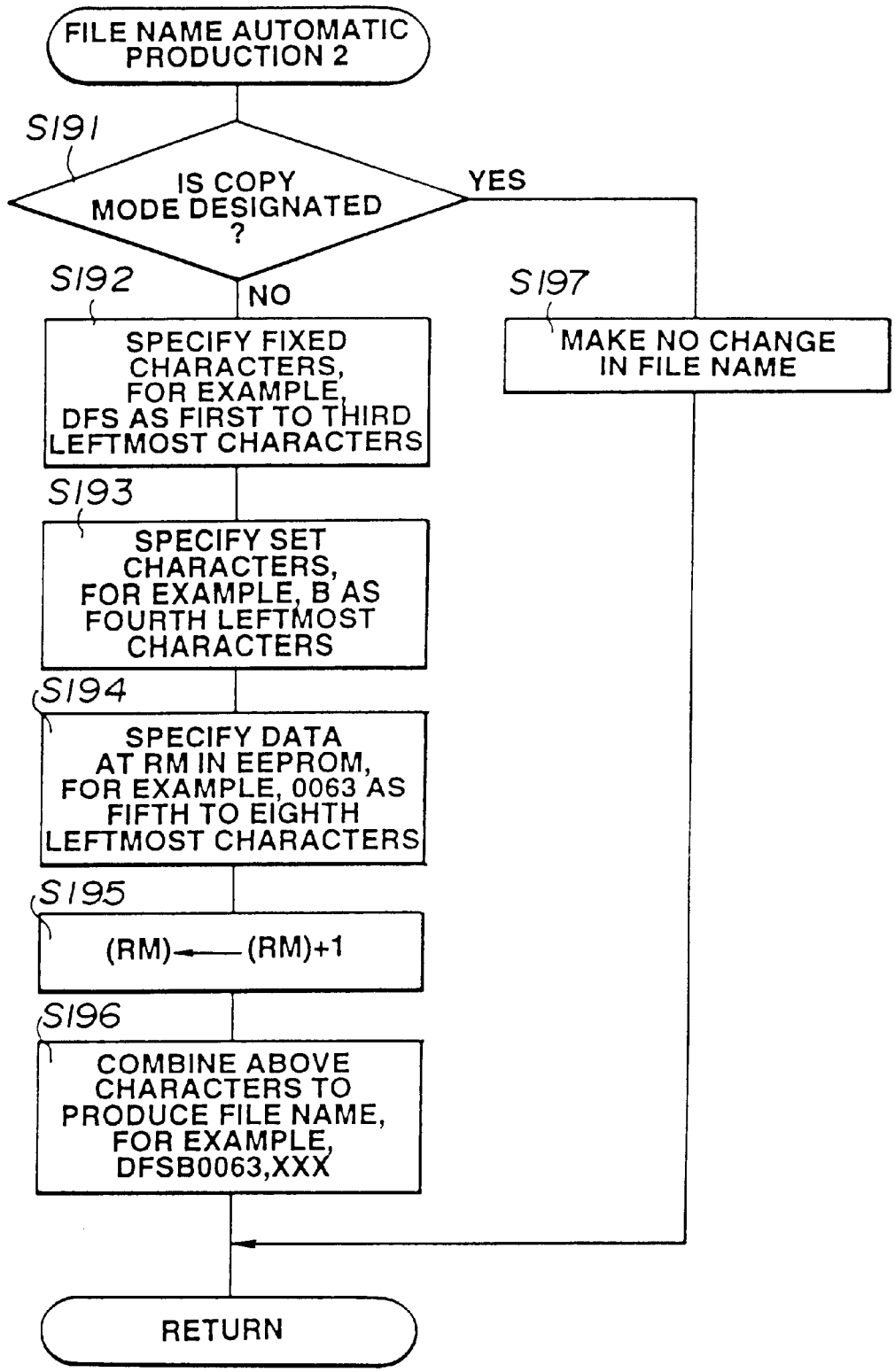
FIG. 20 is a flowchart showing the subroutine File Name Automatic Production 2 called by the subroutine File Name Automatic Production in FIG. 18.

The File Name Automatic Production 2 subroutine runs according to the flowchart of FIG. 20. At step S191, it is determined that a copy mode is designated. If the copy mode is designated, control is jumped to step S197. The subroutine is terminated without any change in a file name. If the copy mode is not designated, control is passed to step S192. Fixed characters, for example, DFS are specified as the first to third leftmost characters of a file name. At step S193, a character specific to the system, for example, B is specified as the fourth leftmost character thereof. At step S194, a value of a serial file number RM stored in the EEPROM 14e, for example, 0063 is specified as the fifth to eighth leftmost characters thereof. At step S195, the value of the serial file number RM is incremented. At step S196, the characters specified at steps S192 to S194 are combined to produce a file name. The foregoing example provides DFSB0063.XXX. Note that XXX denotes a subordinate name of the file name.

As mentioned above, in subroutine File Name Automatic Production 2, even when a plurality of systems of the same kind are installed; since any of the systems is distinguished from another with the fourth character of a file name, the systems can be differentiated from one to another. Moreover, since part of a file name is a serial file number stored and managed in the EEPROM 14e and associated with the file concerned, even if a medium is exchanged for another, a duplicate number will not be created within four characters. When image data is copied, therefore, a file name need not be renamed. A file having a duplicate name will not reside.

This means that image data in an old file having the same name as a new file will not be deleted.

The serial file number RM may be defined with data produced by manipulating values of a year, date, time, minute, and second. The serial file number may be reset to 0s with the second line in the menu screen G3 in FIG. 24 displayed in red.

Next, a power supply for the system will be described.

Figure 25:
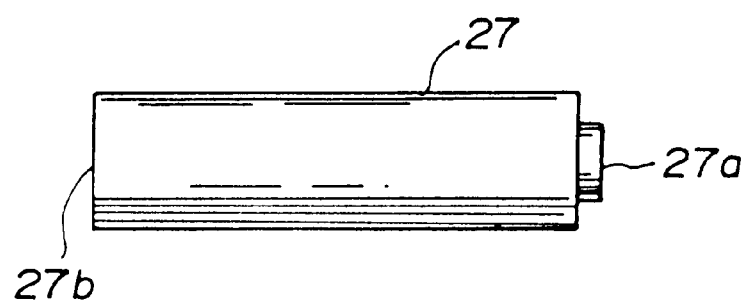
FIG. 25 is a side view showing a battery-like conductor loaded together with another power supply applicable to the image recording/reproducing system in FIG. 1.

The power supply 25(FIG. 1) is composed of the batteries 25. More particularly, six manganese batteries each generating a rated voltage of 1.5 V are connected in series with one another and stowed in a battery casing to constitute a power supply for inputting 9 VDC to the regulator 26. Five lithium batteries each generating a rated voltage of 1.8 V, for example, can be used as alternative batteries. In this case, the power supply accommodates one battery-like conductor 27 shown in FIG. 25 as a dummy battery. Since five 1.8-V batteries are connected in series with one another, the power supply inputs 9 VDC to the regulator.

The battery-like conductor 27 has a first conductive part 27a acting like a positive terminal of a battery and a second conductive part 27B acting like a negative terminal thereof and conducting substantially to the first conductive part. When batteries of another specification, for example, lithium batteries are employed, five lithium batteries and one battery-like conductor 27 are connected in series with one another, so that the supply voltage of the lithium batteries becomes substantially equal to that of six manganese batteries connected in series with one another. Thus, the battery-like conductor helps avoid malfunction due to overvoltage or undervoltage, or prevent circuits from destroying.

As described so far, an image recording/reproducing system serving as an image manipulating system of this embodiment identifies an adopted type of recording medium, sets a recording time interval for interval recording within a range allowed by a ruling means, and then executes interval recording. A recording time interval can be selected depending on a type of information recording medium. Interval recording can therefore be achieved in as strict compliance as is possible responsive to a demand. This results in the user-friendly system.

What is claimed is:

1. A method for creating a file name for a file containing information comprising:

a) storing an unassigned serial file number in a memory;
   b) assigning the unassigned file number in memory to the file responsive to a request for a file name;
   c) incrementing the serial file number; and
   d) storing the incremented file number in memory in readiness for a subsequent request for a file name.

2. The method of claim 1 wherein:
   the file number is comprised of multiple digits.

3. The method of claim 2 wherein the digits are numeric digits.

4. The method of claim 1 wherein:
   the file number is comprised of four (4) digits.

5. The method of claim 1 wherein the file number assigned in step (b) comprises a portion of the file name and further comprising:
   assigning arbitrary characters to the file responsive to the request for a file name; and
   combining the arbitrary characters with the file number to form a file name.

6. The method of claim 5 wherein the arbitrary characters are alphabetic characters.

7. The method of claim 1 wherein the file is created in a manipulation system and said method comprises:
   assigning a character identifying said system; and
   an image manipulating system in accordance with claim.

8. The method of claim 7 further comprising:
   placing the character identifying the system between the arbitrary characters and the file number.

9. The method of claim 7 further comprising:
   operating on said information in an image manipulation system.

10. The method of claim 1 wherein step (a) comprises manipulating values of one or more of a year, date, time, minute and second.

11. The method of claim 1 further comprising assigning a subordinate file name responsive to a request for a file name; and
   combining the subordinate file name with the file number.

12. The method of claim 11 further comprising:
   employing a non-character symbol to separate the file number and the subordinate file name.

* * * * *

UNITED STATES PATENT AND TRADEMARK OFFICE
CERTIFICATE OF CORRECTION

PATENT NO. : 6,636,844 B2
DATED : October 21, 2003
INVENTOR(S) : Kaoru Yoneyama

It is certified that error appears in the above-identified patent and that said Letters Patent is hereby corrected as shown below:

<u>Column 14,</u>
Line 31, after the word "claim", delete "7" and insert therefor -- 1 --.

Signed and Sealed this

Eighteenth Day of May, 2004

JON W. DUDAS
*Acting Director of the United States Patent and Trademark Office*